July 29, 1958 W. R. JALOSKY 2,845,100
LIGHTWEIGHT RECIPROCATING SASH GANG SAW
Filed May 4, 1955 3 Sheets-Sheet 1

INVENTOR.
William R. Jalosky
BY
*Peter P. Price*
ATTORNEY

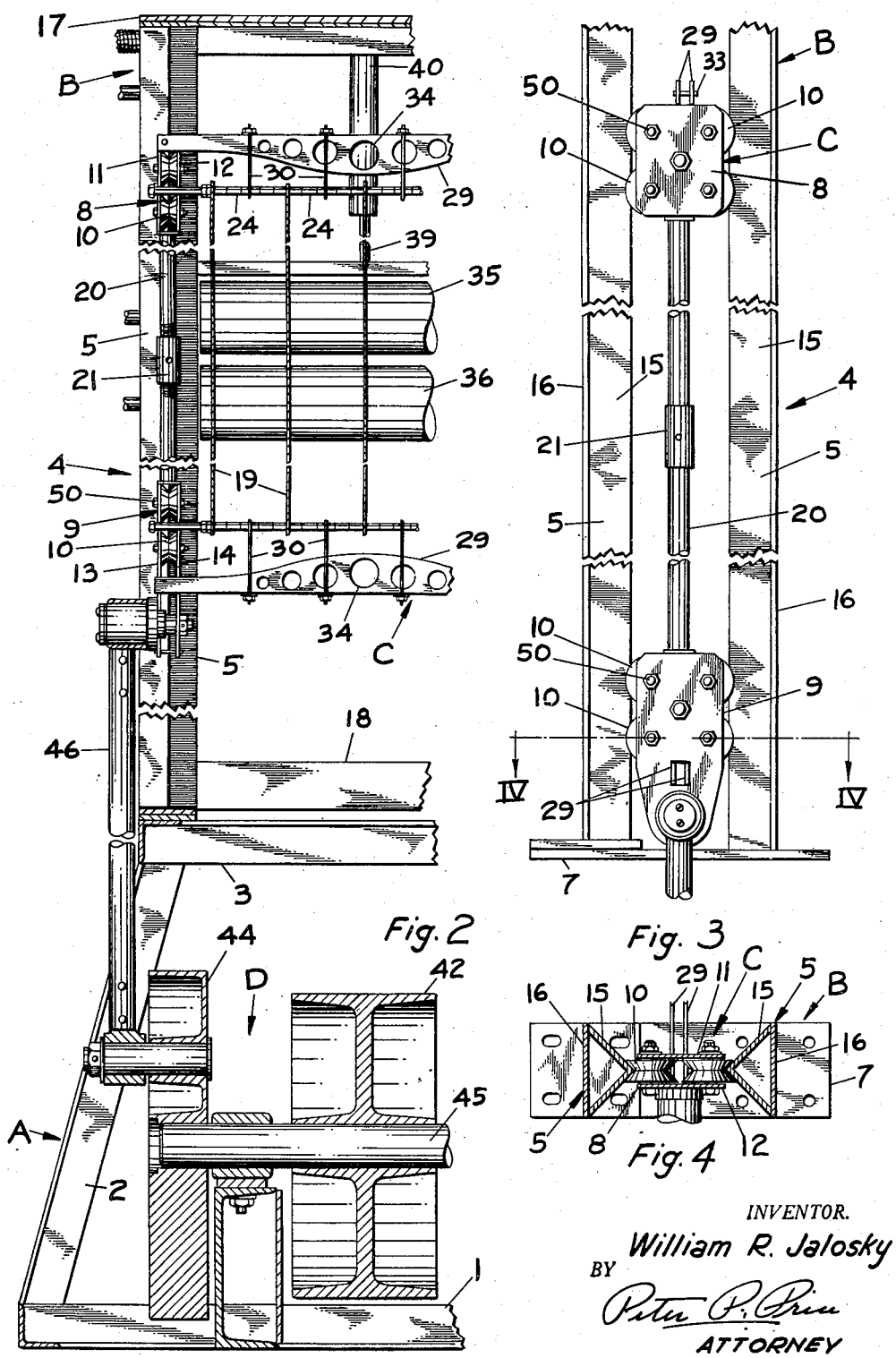

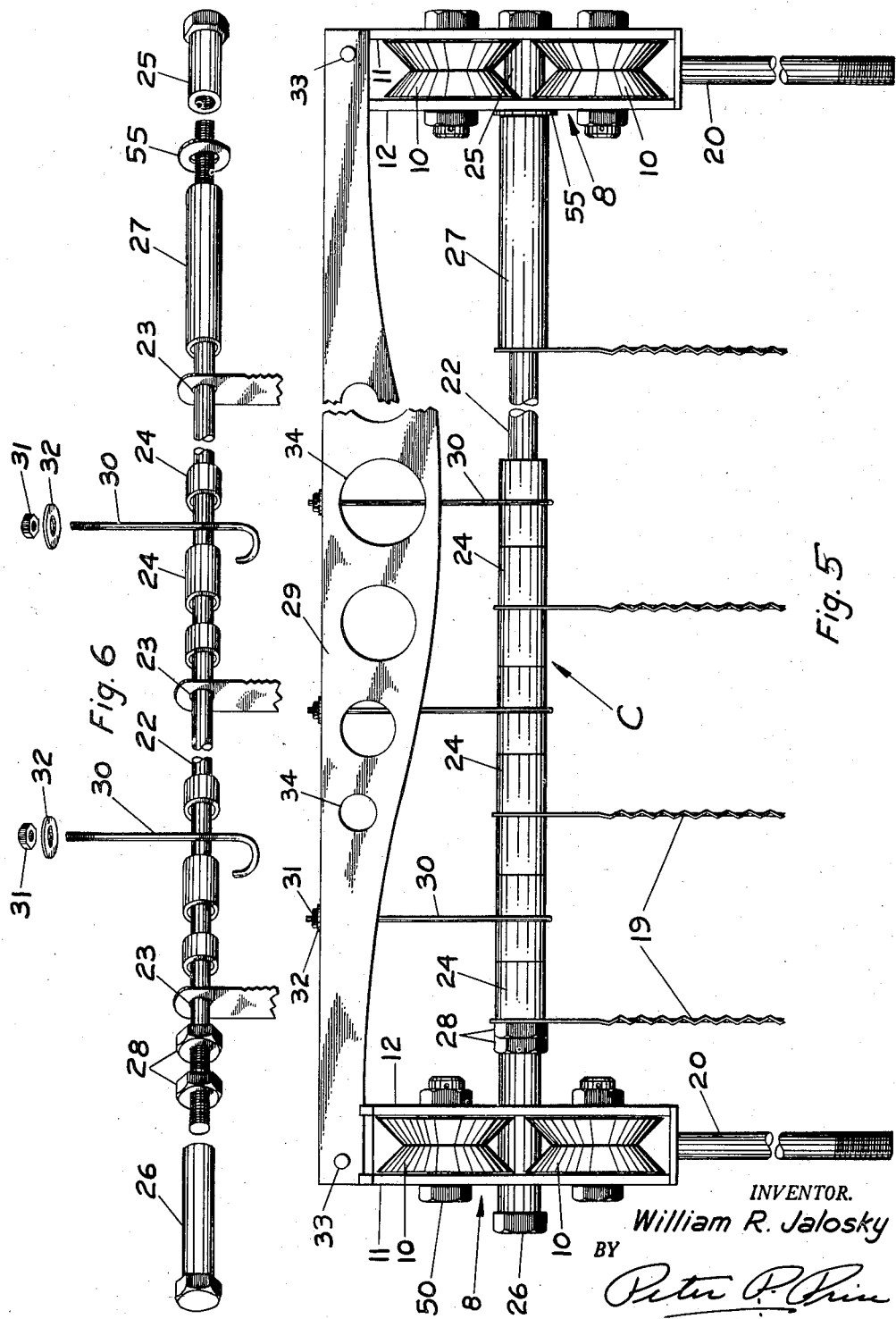

ized sheet lumber.

United States Patent Office 2,845,100
Patented July 29, 1958

2,845,100

LIGHTWEIGHT RECIPROCATING SASH GANG SAW

William R. Jalosky, Muskegon, Mich.

Application May 4, 1955, Serial No. 505,936

3 Claims. (Cl. 143—60)

This invention relates to a saw for ripping a piece of material having a relatively thick cross section into several thinner sections. More particularly it pertains to a wood gang saw designed primarily for use in logging camps, saw mills or other wood manufacturing facilities for ripping logs into cants or into dimensional sheet lumber.

In the lumbering industry there has always been a demand for new and better types of gang saws for use in logging camps to rip the logs into rough lumber. Many devices have been invented and developed but none of these saws have been completely satisfactory. The main drawback of these saws has been the cost of manufacturing them, the individual weight of such units, the inefficiency of the units, and the wear and tear on the units when they are in operation.

An object of this invention is to provide a novel light weight saw machine which is more efficient than present day saws and relatively inexpensive to manufacture.

Another object of this invention is to provide a novel frame and sash arrangement for a reciprocating rip saw which, among other things, materially reduces vibration.

A further object of this invention is to provide a novel construction for a reciprocating sash for a rip saw.

Still another object of this invention is to provide a novel apparatus for mounting saw blades in a sash of a reciprocating saw.

Other objects of this invention will be made apparent in the following description of my apparatus which is made in conjunction with the appended drawings wherein:

Fig. 2 shows a fragmentary, central section view of the assembled saw of this invention, thereby illustrating in more detail than Fig. 1 the specific arrangement of the sash and the frame of this invention along with the driving means for reciprocating the sash.

Fig. 3 shows an enlarged, fragmentary, side view of a portion of the frame of the saw and the ararngement of the wheeled trolleys which ride in the guideways of the frame to guide the sash.

Fig. 4 is a cross section of the frame and wheeled trolley taken along the plane IV—IV of Fig. 3.

Fig. 5 is an enlarged, fragmentary, front view of the top portion of the assembled sash of this invention showing the novel support means for the saw blades mounted on the sash and the arrangement of the wheeled trolleys.

Fig. 6 is a fragmentary, exploded view of the mounting arrangement for the saw blades.

Figure 1:
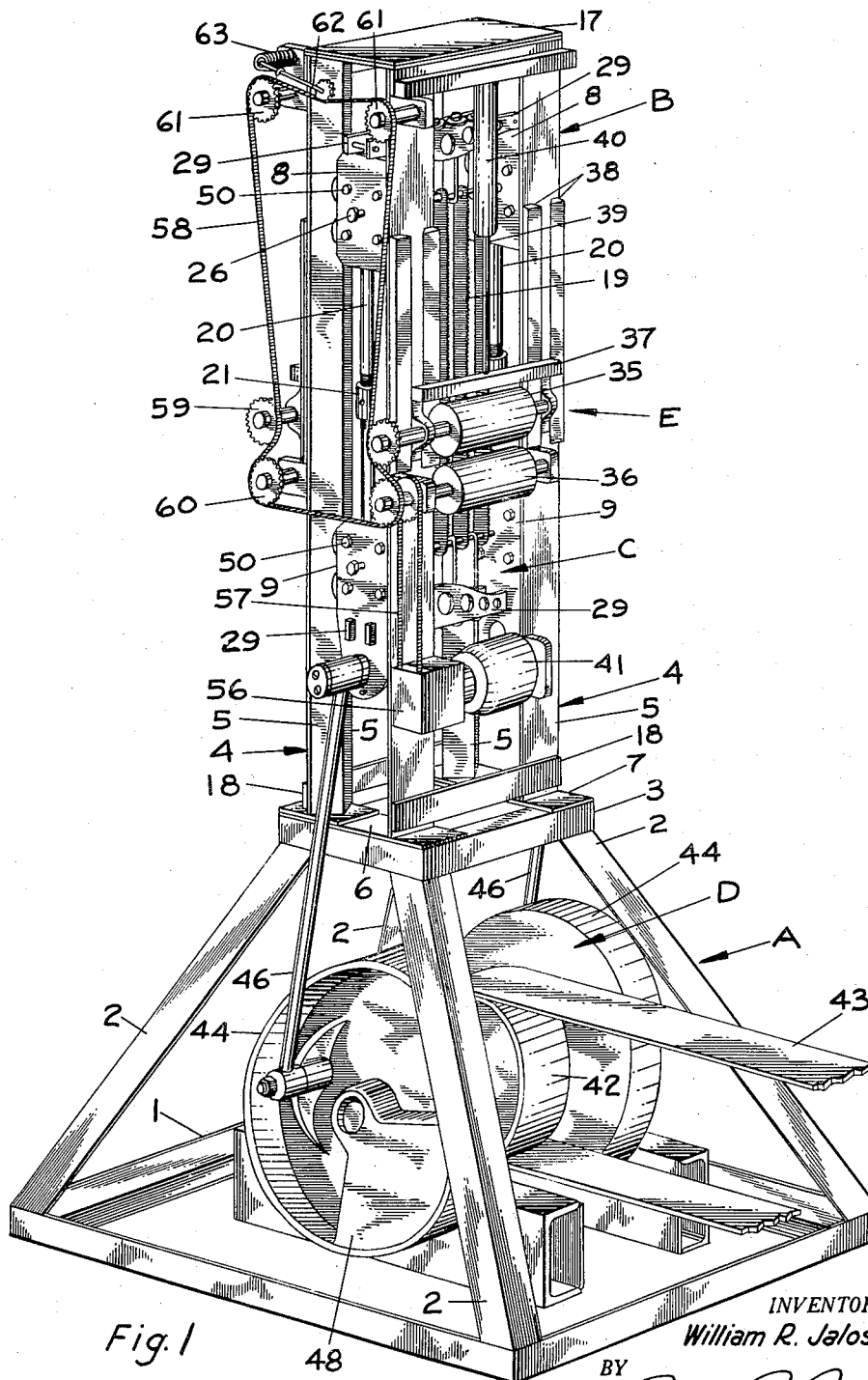
Fig. 1 shows in perspective the assembled saw of this invention.

Briefly, this invention is concerned with a reciprocating sash type saw for ripping pieces of material having a relatively thick cross section into several thinner sections. For example, my saw is especially adapted for use in logging camps to rip logs into cants or into dimensional sheet lumber. The saw of this invention has several outstanding features which contribute to an overall improved saw. These features includes novel skelton type base, frame, and sash, wheeled trolleys for guiding the sash in the frame, a novel support means on the sash for supporting the saw blades, and novel means for tensioning the saw blades.

In describing the saw of this invention, reference is first made to Fig. 1, which shows the entire assembled saw, and Fig. 2 which shows a cut out portion of the assembled saw of Fig. 1. It will be apparent from these figures that the saw comprises five main parts: base A, frame B, sash C reciprocally mounted in the frame, driving means D for reciprocating sash C, and feed mechanism E.

Base A is predominantly made up of angle irons or other suitable structural beam-like elements in order to reduce the overall weight and cost of the saw. At the foot of base A there are provided four angle irons connected together at their ends to form a rectangularly shaped base 1. On all four corners of base bottom 1 are fixedly mounted angle iron suport members 2 which extend upwardly on an inclined angle toward the center of the rectangle and support the base top 3. The construction of base top 3 is also of angle irons as is shown more clearly in Fig. 2. It should become apparent from the drawings and the above description that the base A is compartively light weight and easy to make and assemble thus contributing to an overall reduction in the cost and weight of the entire machine.

Frame B is mounted directly on the base top 3. It comprises two guideways 4, each composed of a pair of spaced, upright tracks 5 between which ride the wheeled trolleys of the sash as described hereinafter. The guideway 4 on one side is securely mounted to plate 6 and the guideway 4 on the other side is securely monted to plate 7. Both plates 6 and 7 lay flat on base top 3 and are rigidly fixed thereto so that the frame B is supported by base A.

An important feature of my invention is the use of wheeled trolley units 8 and 9 for guiding sash C which is mounted for reciprocation on frame B. These trolley units reduce the drag incident in the reciprocation of the sash, thereby increasing the efficiency of the unit. They also serve to absorb some of the momentum of the sash which very often is the main source of wear and tear on reciprocal saws and consequently the main cause of breakdowns. To this end, the wheels of my trolley units 8 and 9 tend to keep rotating at the end of each stroke of the sash and as they continue to spin at the same speed and in the same direction as at the center of the stroke, the wheels tend to absorb some of the momentum of the sash.

The details of the construction of my trolley units are shown in Figs. 2, 3, 4 and 5. It will be noted that trolley units 8 and 9 are almost identical, the only difference being in the shape of the end plates between which the wheels are rotatably mounted. Trolley unit 8 comprises four grooved wheels 10 rotatably mounted between plates 11 and 12. Trolley unit 9 comprises four wheels 10 rotatably mounted between end plates 13 and 14. Each of the wheels is supported for free rotation on a bolt 50. The spacing of the wheels laterally of the trolley is such that the sash will be smoothly guided between the tracks 5 without play or chatter. The wheels in each case are arranged for rotation in the same plane about different axes passing through the four corners of an imaginary rectangle. The specific relationship of the trolley units to the other parts of sash B will be described hereinafter.

Another feature of my saw machine is the specific construction of frame B. As stated previously, it is comprised of two guideways for the wheeled trolleys 8 and 9 of sash C, each of the guideways having two parallel tracks. This construction is shown in more detail in Figs. 3 and 4 which show a side and top view, respectively, of one of the guideways. Parallel tracks 5 are shown mounted upright on plate 7. Each of the tracks as shown best in Fig. 4 is triangular shaped. The tracks have their vertexes pointing toward each other so that they fit in the grooves of wheels 10 of trolleys 8 and 9. As a result, the wheels 10 ride on the vertexes of the triangularly shaped tracks 5. It should also be noted that each of the tracks 5 is constructed of angled material 15, either iron or steel, which has a backing plate 16 over the open part of the angle to transform it structurally into a tube. The backing plate 16 also serves as the mounting for the feed mechanism E which will be described hereinafter. The tubular construction permits the tracks to be compact and rigid yet of light weight. This construction of the tracks also contributes to the light weight of my machine. In Fig. 1 it will be seen that the tracks 5 of the guideways are parallel to each other. The guideways 4 are themselves maintained in parallel relationship by the cap structure 17 and the bottom spacer bars 18.

As previously described, the sash C has the feature of being mounted for reciprocation in the frame B by means of wheeled trolley units 8 and 9. As a unit itself, it has several additional outstanding novel features. Among these novel features is the means for tensioning and supporting saw blades 19. The construction of sash C is illustrated best in Figs. 2, 3, 5 and 6.

As evidenced from the drawings, sash C is broadly composed of two parallel side supports each comprising a rod member 20 and trolley units 8 and 9. A trolley unit 8 and 9 is rigidly attached in any well known manner to the top and bottom ends, respectively, of each rod member. A novel saw blade support means, described hereinafter, is mounted at the upper and lower portions of said side supports with the shaw blades 19 extending parallel to the side supports between their support means.

On the side supports I have provided a means for tensioning saw blades 20 as a group. This means is a turn buckle arrangement 21 located intermediate the ends of each rod member 20. With this arrangement, after saw blades 19 have been assembled to the sash by means of its support means, the turn buckles are turned, lengthening the rod members 20, thus increasing the tension on the blades, as a group. By the same token, the tension on the saw blades can be decreased by turning the turn buckles in the opposite direction. The turn buckle arrangement 21 shown comprises a universal coupling threaded between the two ends of each of the rod members 20.

Figs. 5 and 6 show the saw blade support means. This support means provides a simple, low cost, light weight means for holding the blades in position, thus contributing to the light weight construction of the sash and of the entire machine. The light weight of the sash reduces the momentum of the sash, thus increasing the permissible operating speed and permitting the use of the light weight frame previously described. It also reduces operating vibration and energy consumption of the machine.

In Figs. 5 and 6 there is shown the relatively thin rod 22 extending through holes 23 of the saw blades 19. The apertures in the ends of the saw blades seat closely about the rod 22. Tubular spacers 24 are seated about the rod 22 between saw blades 19 to maintain the spacing between the blades. The number and length of the spacers 24 is determined by the spacing of the saw blades. The ends of rod 22 are threaded and extend through plates 11 and 12 of trolley units 8. The ends of the rod 22 are held in place by internally threaded tubular end units 25 and 26, respectively. A tubular spacer 27 may, in some cases, be provided between one side plate 12 and one end saw blade 19. A washer 55 is provided between the end of the spacer 27 and the face of the adjacent trolley 8. The washer 55 serves as a lateral stop for the assembled saw blades and spacers. Near the other end of the rod, the nuts 28 hold the other end saw blade 19 and all the spacers 24 and blades 19 tightly together by pressing them against the washers 55.

Rod 22 by itself is not capable of supporting the blades especially when loads incident to the operation of the machine are imposed upon them. Therefore, in order to support rod 22, there are provided two spaced beams 29. The operating loads imposed upon the rod 22 are transmitted to the beams 29 by the U-shaped hooks 30. The hooks 30 are engaged about the tubular spacers 24. The hooks 30 are individually drawn upwardly and supported by means of the nuts 31 and cross pieces 32 which rest on both of the beams 29.

The shape of the beams 29 permits a substantial reduction in the weight of the sash. Beams 29, as shown, are relatively thin sheets of metal, preferably steel, held together by pins 33. They each have arched intermediate portions to provide additional strength. The arching is designed to conform to the deflection curve created by the loadings imposed. It thus provides rigid support against deflection of the beams. Holes 34 are provided to decrease the weight of the beam. As illustrated in Fig. 5, end portions of beams 29 rest directly on and are welded to the trolley units of the side supports.

The support structure for the saw blades 19, including the use of the rod 22, spacers 24, end spacer 27, stop washer 55, cinching nuts 28, end units 26, hooks 30 and beams 29, are identical at each end of the sash. The beams 29 at the bottom of the sash are inverted so that the arch extends upwardly. It should be noted that the beams of the lower saw blade support means, as shown in Figs. 2 and 3, extend through a slot in the end plates 13 and 14, this being the only difference between the upper and lower saw blade support means.

Having described the most salient features of my invention, the operation of the entire machine should be evident. Therefore, it should be apparent that the material to be sawed, for example a log, is first fed through the feed rollers 35 and 36 of the feed mechanism E. In feeding the log through this mechanism, the top roller 35, which is mounted on carriage 37, moves upwardly as carriage 37 slides vertically between wedge-shaped guides 38. Pressure is maintained on roller 35 by means of rod 39 which is hydraulically or pneumatically extended by the power cylinder 40. Motor 41 drives the rollers through a gear reducer 56 and chain 57. The chain 57 drives the lower feed roller 36. Another sprocekt is mounted on the shaft of the lower feed roller 36. This sprocket drives the chain 58 which in turn drives the upper feed roller 35 and a sprocket 59 for the upper discharge roller and a sprocket 60 for the lower discharge roller. At the top of the machine the chain 60 passes about two idler sprockets 61 between which it is tensioned by a sprocket on the end of the pivoted arm 62 biased downwardly by the spring 63. The feed rollers push the cants into the saw blades 19 and the discharge rollers pull the cut wood past the blades. As the log is pushed into the saw blades 19, sash C, including the saw blades, reciprocates up and down on the tracks 4 of frame B. This reciprocal motion is generated by the driving means D which comprises a center pulley 42, driven from a prime mover by belt 43. Fly wheels 44, mounted on each side of pulley 42 and on the same axle 45 (Fig. 2), are operatively connected to sash C by pitmans 46. The pitmans 46 are journaled to side plates 13 and 14 of the lower trolley units 9. The pitmans 46 are also eccentrically journaled to the fly wheels 44. To reduce vibration the fly wheels 44 are counterbalanced at 48. Thus once every revolution of fly wheel 44, sash C reciprocates in frame B.

This saw, although entirely supported by a light weight, skeleton type frame made up wholly of welded angle iron, is capable of high speed operation under severe logging conditions. The lightness of the sash construction and the momentum absorption of the trolley wheels makes high speed, heavy duty operation possible because of the enormous reduction in vibration incident to the reciprocation of the sash. This reduces both initial cost and maintenance. By eliminating the structural masses heretofore considered necessary to absorb vibration, the foundation structure required is also reduced. All of the machine's components are made readily accessible for adjustment, lubrication and maintenance.

Having described my invention in detail and also the operation thereof, it should be understood that many of the details described herein should not be construed as limiting the scope of my invention except as set forth in the following claims.

I claim:

1. A ripping saw for sawing a thick section of material into several thin sections comprising a base, a frame rigidly mounted on said base, a sash reciprocally mounted in said frame, said frame comprising a pair of parallel spaced guideways, said guideways each comprising a set of two parallel spaced tracks having similar shaped surfaces facing each other, said sash comprising parallel side supports, saw blade support means rigidly mounted on the top and bottom portions of said side supports, a plurality of saw blades extending between and supported by said support means, and wheeled trolley units on each side support for riding in said guideways, said trolley units each comprising four wheels rotatably mounted on said unit all about parallel axes and on the same plane, said wheels of each unit being arranged so that for each set of tracks two of said wheels ride on the shaped surface of one track and the other two wheels ride on the shaped surface of the other track and means for reciprocating said sash in a direction parallel to said guideways whereby said wheels will ride back and forth on said guideways thereby directing the path of said sash and said saw blades.

2. A ripping saw for sawing a thick section of material into several thin sections comprising a base, a frame rigidly mounted on said base, a sash reciprocally mounted in said frame, said frame comprising a pair of parallel spaced guideways, said guideways each comprising a set of two parallel spaced tracks having similarly shaped surfaces facing each other, said sash comprising parallel side supports, saw blade support means rigidly mounted on the top and bottom portions of said side supports, a plurality of saw blades extending between and supported by said support means, said side supports having adjusting means located intermediate its ends for adjusting the length of said side supports thereby providing means for increasing the distance between said saw blade support means for applying a tension to said saw blades, and trolley units mounted on each of said side members, said trolley units comprising four wheels adapted to rotate about parallel axes and all on the same plane, said wheels being arranged so that for each set of tracks two of said wheels ride on the shaped surface of one track and the other two wheels ride on the shaped surface of the other tracks, and means for reciprocating said sash in a direction parallel to said guideways whereby said wheels will ride back and forth on said guideways thereby directing the path of said sash and said saw blades.

3. A ripping saw for sawing a thick section of material into several thin sections comprising a base, a frame rigidly mounted on said base, a sash reciprocally mounted in said frame, said frame comprising a pair of parallel spaced guideways, said guideways each comprising a set of two parallel spaced tracks having similar shaped surfaces facing each other, said sash comprising parallel side supports, saw blade support means rigidly mounted on the top and bottom portions of said side supports, a plurality of saw blades located in the space between said side supports and having aligned holes in proximity to their ends, said saw blade support means on the top and bottom of said side supports each comprising a rod extending through said aligned holes and rigidly connected to said side supports at a short distance from the ends thereof, a plurality of tubular spacers located on said rod between said saw blades providing a means for maintaining the spacing of said blades, a beam supported by said sides supports and U-shaped hooks connected to said beam and hooked around said tubular spacers to support said rods, means for adjusting the length of said side supports whereby the tension of the saw blades can be adjusted, and trolley units secured to each of said side supports, said trolley units each comprising four wheels adapted to rotate about parallel axes and all on the same plane, said wheels being arranged so that for each set of tracks two of said wheels ride on the shaped surface of one track and the other two wheels ride on the shaped surface of the other track, and means for reciprocating said sash in a direction parallel to said guideway whereby said wheels will ride back and forth on said guideways thereby directing the path of said sash and said saw blades.

References Cited in the file of this patent

UNITED STATES PATENTS

| | | |
|---|---|---|
| 212,526 | Wickes | Feb. 18, 1879 |
| 598,446 | Shettleworth | Feb. 1, 1898 |
| 1,585,543 | Horold | May 18, 1926 |
| 1,868,845 | Osterberg | July 26, 1932 |

FOREIGN PATENTS

| | | |
|---|---|---|
| 173,792 | Germany | July 27, 1906 |
| 120,048 | Switzerland | May 2, 1927 |
| 448,680 | Germany | Aug. 25, 1927 |